United States Patent [19]

Renkey et al.

[11] 4,017,316

[45] Apr. 12, 1977

[54] FIREPROOF STAMPING MASS FOR TAP SPOUTS AND FLUES IN BLAST FURNACES

[75] Inventors: Albert Lajos Renkey, Dusseldorf-Wittlaer; Hans-Peter Engelhardt, Krefeld, both of Germany

[73] Assignee: Magnesital-Feuerfest GmbH, Oberhausen, Germany

[22] Filed: Mar. 26, 1975

[21] Appl. No.: 605,246

[30] Foreign Application Priority Data

Mar. 28, 1974 Germany .......................... 2414965

[52] U.S. Cl. .............................. 106/15 FP; 106/68; 106/69; 106/278; 106/281 R; 106/284; 252/8.1; 252/62

[51] Int. Cl.$^2$ .......................................... C09D 5/18

[58] Field of Search ........... 106/15 FP, 277, 281 R, 106/38.25, 38.8, 284, 68, 69, 278; 252/8.1 62

[56] References Cited

UNITED STATES PATENTS

| | | | |
|---|---|---|---|
| 1,734,437 | 11/1929 | Kirschbraun | 106/277 |
| 3,482,008 | 12/1969 | Hibshman | 106/281 R |
| 3,491,045 | 1/1970 | Metil | 106/281 R |
| 3,497,371 | 2/1970 | Chang | 106/277 |
| 3,632,320 | 1/1972 | Hemni et al. | 51/298 |

*Primary Examiner*—Lorenzo B. Hayes
*Attorney, Agent, or Firm*—Burgess, Dinklage & Sprung

[57] ABSTRACT

Fireproof stamping mass containing pyrophillite, silicon carbide, plastic clay, quarzite, a carbonaceous bonding agent and water.

8 Claims, No Drawings

FIREPROOF STAMPING MASS FOR TAP SPOUTS AND FLUES IN BLAST FURNACES

The invention relates to a fireproof stamping mass for tap spouts and stack flues in blast furnaces consisting of one or several fireproof basic components having at least one means for inducing a bonding of the basic component(s).

The classical mass for the lining of these regions of the blast furnace consists of a mixture of fire-clay or sand, clay as a bonding agent and water. Other masses known for a long time consist of sand and tar.

The requirements demanded of tapping spouts and stack flues have grown recently as a result of the considerably increased daily output of blast furnaces and the resultant fast consecutive tapping. As little time remains for a new lining when the sequence of tapping is faster the durability of the fireproof mass is crucial for the efficiency of a blast furnace.

Various masses having increased durability have already been proposed. Such masses contain a high percentage of aluminum oxide, if necessary with the addition of further fireproof materials, and a bonding agent on a carbon base or of ceramic clay or a chemical bonding agent.

The object underlying the invention is to develop a mass for tapping spouts and stack flues which has both considerably increased durability and is also environmentally acceptable and enables the blast furnace to become quickly ready for operation again. Therefore the fireproof mass is to effect an improvement in the economy of the blast furnace on account of its material and processing properties.

The object of the invention is a stamping mass for tapping spouts and stack flues in blast furnaces having the following components:

1. 10 to 60% by weight pyrophillite ($Al_2O_3 \cdot 4\ SiO_2 \cdot H_2O$),
2. 5 to 30% by weight silicon carbide,
3. 5 to 20% by weight plastic clay ($Al_2O_3 \cdot SiO_2 \cdot x\ H_2O$),
4. 5 to 25% by weight quarzite
5. 5 to 15% by weight carbonaceous bonding agent having a fusion point of 110° C to 200° C (without the components which become gaseous at operating temperature),
6. a quantity of water suitable for attaining optimal density.

The so called "ball clay" is preferably used as plastic clay. The x in the chemical formula of the plastic clay means that the moisture content can vary. For quarzite, which is naturally found as dense and hard rock predominantly consisting of quartz, is preferably used a transformable quarzite, i.e. a material which slowly transforms into the not particularly slag-resistant modifiication cristoballite and tridimite under the effect of heat. A favourable value for the proportion of water which has been confirmed by practice is 6 – 9% more particularly 7 – 8.5%.

A high molecular tar, a hard pitch or a carbonaceous resin can be used as a carbonaceous bonding agent.

The components of the mass preferably have the following grain size:

1. Pyrophyllite 0 to 8 mm, preferably 0 to 6 mm,
2. silicon carbide 0 to 1 mm,
3. plastic clay maximally 0.5 mm, preferably 0.1 mm,
4. quarzite as coarse grain, preferably 3 to 8 mm,
5. carbonaceous bonding agent maximally 0.5 mm.

Operational experiments have shown that spouts and flues stamped from this mass last for several weeks up to more than a month. It has not yet been established in detail to what this result is attributed. It appears that the per se known property of the pyrophyllite plays a part as this micaceous material grows on heating and consequently is contrasted with the fireproof mass which reduces on heating. Furthermore the bonding combination should have a favourable effect on behaviour during use.

All in all the mass according to the invention differs from conventional masses in that therein only a comparatively small proportion of $Al_2O_3$ needs to come from the pyrophyllite.

The fact that the mass according to the invention can be transported and stored in its useable state, therefore containing the mixing water, is advantageous. By the addition of mixing water it can also naturally be made sufficiently moist at the place of use; however a moist mass has the advantage that it can not be decomposed during transport, for example.

The following masses have proved their worth for the individual regions of the tap spout and the flue:

1. in the region of the tap in which the spout is strongly stressed by the erosive effect of the iron and slag stream and also by the corrosive effect of the slag a mass having the following composition is preferably used according to the invention:
   ca. 40% pyrophyllite, grain size max. 6 mm,
   25 – 30% silicon carbide, grain size max. 1 mm,
   10% plastic clay, grain size max. 0.5 mm,
   ca. 10% quarzite, grain size max. 8 mm,
   10 – 15% carbonaceous bonding agent having a fusion point of more than 150° C, preferably hard pitch, grain size max. 0.5 mm,
   7 – 8% water.

This mass is also particularly advantageous when the angle of inclination of the spout in the region of the tap is over 20°.

2. In the region of the flue in which it concerns a stamping part having a large surface area and strong wall thickness, the following mass according to the invention gave good results:
   ca 45% pyrophyllite, grain size max. 8 mm,
   ca. 20% silicon carbide, grain size max 1 mm,
   ca. 5% plastic clay, grain size max. 0.5 mm,
   ca. 15% quarzite, grain size max. 8 mm,
   ca. 15% hard pitch having a fusion point of over 130° C, grain size max. 0.5 mm,
   6% water.

3. In the pig iron spout next to the flue, i.e. in a region in which the slag is very extensively precipitated and practically only pig iron runs over the spout, the following mass according to the invention met the necessary requirements:
   40% pyrophyllite, grain size max. 6 mm,
   ca. 10% silicon carbide, grain size max. 1 mm,
   20% plastic clay, grain size max. 0.5 mm,
   25% quarzite, grain size max. 0.5 mm,
   ca. 5% hard pitch having a fusion point of over 130° C, grain size max. 0.5 mm,
   8 – 8.5% water.

We claim:
1. An aqueous stamping mass for tap spouts and flues in blast furnaces consisting essentially of
   1. 20–60% by weight pyrophyllite ($Al_2O_3 \cdot 4\ SiO_2 \cdot H_2O$) having a particle size of up to 8 mm,
   2. 5–30% by weight silicon carbide,

3. 5–20% by weight plastic clay ($Al_2O_3 \cdot SiO_2 \cdot \times H_2O$),
4. 5–25% by weight quartzite,
5. 5–15% by weight carbonaceous bonding agent having a fusion point of 110°–200° C (without the components becoming gaseous at operating temperature), and
6. a suitable quantity of water for attaining optimal thickness.

2. An aqueous stamping mass according to claim 1, characterised in that the carbonaceous bonding agent is a tar.

3. An aqueous stamping mass according to claim 1, characterised in that the carbonaceous bonding agent is a pitch.

4. An aqueous fireproofing stamping mass according to claim 1 wherein said silicon carbide has a particle size of up to 1 mm., said plastic clay has a maximum particle size of 0.5 mm., said quartzite is in the form of a coarse grain structure and said carbonaceous bonding agent is present in a maximum particle size of 0.5 mm.

5. A stamping mass according to claim 1 wherein said pyrophyllite has a particle size up to 6 mm, said plastic clay has a particle size of approximately 0.1 mm. and said quartzite has a particle size of 3–8 mm.

6. An aqueous fireproofing stamping mass according to claim 1 wherein said plastic clay is a ball clay.

7. An aqueous stamping mass according to claim 1 wherein said water is present in an amount of 6–9% by weight.

8. A stamping mass according to claim 7 wherein said water is present in an amount of 7–8.5% by weight.

* * * * *